United States Patent
Chehab et al.

(10) Patent No.: US 8,636,357 B2
(45) Date of Patent: Jan. 28, 2014

(54) CUSTOM CONTACT LENSES WITH FIDUCIAL MARKINGS

(75) Inventors: Khaled Chehab, Jacksonville, FL (US); Michael J. Collins, Jollys Lookout (AU); Jeffrey H. Roffman, Jacksonville, FL (US); Ross Franklin, Jacksonville, FL (US); Brett A. Davis, Holland Park (AU); D. Robert Iskander, Bellbowrie (AU)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 223 days.

(21) Appl. No.: 12/533,797

(22) Filed: Jul. 31, 2009

(65) Prior Publication Data

US 2011/0025979 A1 Feb. 3, 2011

(51) Int. Cl.
G02C 7/04 (2006.01)
G02C 7/02 (2006.01)

(52) U.S. Cl.
CPC *G02C 7/04* (2013.01); *G02C 4/049* (2013.01); *G02C 7/021* (2013.01)
USPC ............... 351/159.02; 351/159.8; 351/159.69

(58) Field of Classification Search
CPC ........... G02C 7/04; G02C 7/049; G02C 7/021
USPC ................. 351/160 R, 159.02, 159.8, 159.69
See application file for complete search history.

(56) References Cited

U.S. PATENT DOCUMENTS

| 2,664,025 | A | * | 12/1953 | Herman | 351/160 R |
|---|---|---|---|---|---|
| 3,285,512 | A | * | 11/1966 | Reynolds | 351/247 |
| 4,268,133 | A | * | 5/1981 | Fischer et al. | 351/159.02 |
| 4,525,044 | A | | 6/1985 | Bauman | |
| 5,062,701 | A | | 11/1991 | Drazba | |
| RE37,071 | E | | 2/2001 | Gabrielian et al. | |
| 6,203,156 | B1 | * | 3/2001 | Wu et al. | 351/159.69 |
| 6,305,802 | B1 | * | 10/2001 | Roffman et al. | 351/160 R |
| 6,491,393 | B1 | * | 12/2002 | Appleton | 351/160 R |
| 7,322,694 | B2 | * | 1/2008 | Dahi et al. | 351/160 R |

FOREIGN PATENT DOCUMENTS

| WO | WO 98/28653 | 7/1998 |
|---|---|---|
| WO | WO 01/11418 | 2/2001 |
| WO | WO 2005/015290 | 2/2005 |
| WO | WO 2005/050260 | 6/2005 |
| WO | WO 2006/012156 | 2/2006 |
| WO | WO 2009/014509 | 1/2009 |

OTHER PUBLICATIONS

"Corneal Limbus." TheFreeDictionary.com. Web. Apr. 26, 2012. <http://medical-dictionary.thefreedictionary.com/corneal limbus>.*
Morreland et al, "Automatic Estimation of the Corneal Llimbus in Videokeratoscopy", IEEE Transactions in Biomedical Engineering, vol. 49, No. 12, Dec. 2000, pp. 1617-1625.
PCT International Search Report, date of mailing Dec. 17, 2010 for PCT Int'l. Appln. No. PCT/US2010/043396.

* cited by examiner

*Primary Examiner* — Zachary Wilkes

(57) ABSTRACT

A contact lens having one or more fiducial marks that allow the measurement of lens rotation and centration. The lens may be a trial lens. The lenses can be used to apply correction factors for sphero-cylindrical refractive error, higher order aberrations, and corneal topography.

3 Claims, 7 Drawing Sheets

CUSTOM CONTACT LENSES WITH FIDUCIAL MARKINGS

BACKGROUND OF THE INVENTION

This invention relates to designs and methods for improving the fitting and alignment of customized ophthalmic contact lenses.

Sphero-cylindrical corrections are well known, and have been used extensively. Customized corrections, however, can include not only conventional sphero-cylindrical correction, but also the correction of higher order aberrations that require more precise location of the lens both in centration as well as rotation. This invention provides a method and design to improve ophthalmic contact lens fitting of customized designs.

SUMMARY OF THE INVENTION

The invention is a customized trial contact lens having one or more fiducial marks that enable the measurement of lens rotation and centration. The lenses can be used to apply correction factors to custom contact lens designs incorporating sphero-cylindrical refractive error, higher order aberrations, or corneal topography.

In yet a further aspect of the invention, fiducialization marks on the lens do not obscure the center of the lens on which they are applied.

In yet a further aspect of the invention, a method for fitting a customized contact lens includes measuring a patient's basic refractive prescription, high order refractive aberrations and corneal topography, designing and fabricating a rotationally stabilized custom fiducialized trial contact lens incorporating one or all of these measurements, fitting the lens to a patient's eye and obtaining an image, a series of images, or a video of the lens position on the eye, analyzing the position of the customized fiducialized trial contact lens relative to the limbal center, and designing a final customized contact lens based upon analysis. Acquiring corneal topographic information of an eye of a person can be included using a corneal topographer or a videokeratoscope and the sum total optical aberration of the eye can be determined using a wavefront sensor.

DETAILED DESCRIPTION

Figure 1:
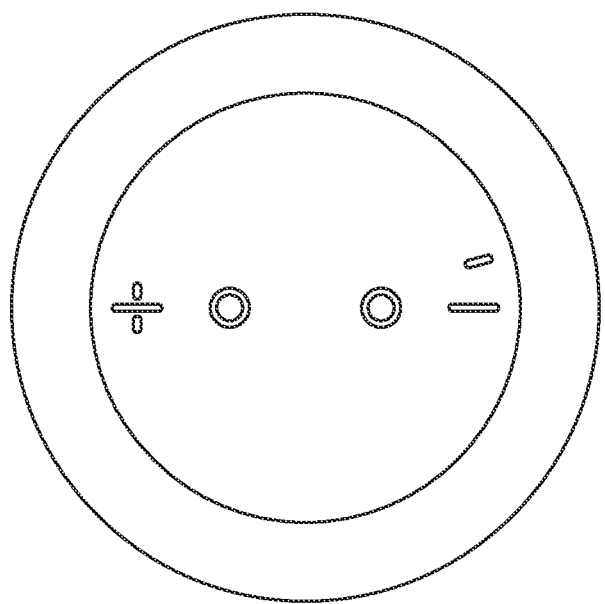
FIG. 1 Shows a preferred fiducial design used on customized trial contact lens.

The invention is a contact lens useful in the fitting of a customized contact lens design, and methods for using this lens. Preferably, the lens is a customized trial lens used to further refine the prescription of custom designs.

Various measurements are used to provide data for vision correction and are incorporated into lens design and production. Conventional refraction yields the patient's low order sphero-cylindrical corrective prescription components. These are the spherical power, the cylindrical power and axis. Higher order refractive correction is enabled by a wavefront measurement. Ocular wavefront data is collected from a patient using a wavefront sensor such as a COAS (Wavefront Sciences Inc., Albuquerque, N.M.). This wavefront data is generally in the form of Zernike polynomial coefficients, but can also be a set of wavefront heights at specified Cartesian or polar coordinates. A preferred system to designate the Zernike coefficients has been described as the OSA method, in ANSI Z80.28.

Data regarding the topography of the cornea is collected from a patient using a device such as the Keratron or Keratron Scout, (Optikon 2000, Rome, Italy). These devices function by interpreting the reflection of multiple annular ring images off of the cornea. The topographic data is available in several formats. The preferred format in the present invention is to depict the cornea as a topographic elevation map. The topography data may be utilized in customizing the contact lens design, or may be used to guide selection of the most appropriate back surface contact lens shape.

In a preferred embodiment, a fiducialized contact lens is designed to refine and improve the fitting precision of a proposed final customized contact lens that incorporates one or all of these measurements. This lens is used to determine how a lens designed using custom spherocylinder, topographic or wavefront features will rotationally orient and center on the eye. Determinations about the orientation and centration of the inventive lenses are used to improve and optimize the design of the final custom contact lenses for a patient, which increases the likelihood of improved visual acuity and proper fit.

In a preferred embodiment, the rotation and centration of a customized trial contact lens is measured relative to the corneal limbal center. This is advantageous over designs which measure centration relative to the pupil center since the pupil center changes with accommodation and vergence of the eye. Unlike the corneal geometric center, the pupil center changes position and moves in location with pupil constriction and or dilation. On the other hand, the corneal geometric center is stable in position, and easier to visualize, especially for dark iris patients. In a preferred embodiment, the trial customized contact lens is rotationally stabilized by known or suitable means.

The markings on the inventive lenses are placed such that they are visible when the contact lens is viewed or photographed in a clinical situation or setting. Viewing methods include direct viewing with a slit lamp, photographic or video recording of the slit lamp image, or any other means to record the lens position and rotation. Electronic digital photography/video recording is preferred, as it eliminates having to digitize a photograph on paper, and electronic photographs can be easily loaded into measurement software. Conventional paper photographs can also be used. The marking is placed such that it is visible under normal conditions of wear.

In an alternate embodiment, the centration of the contact lens is determined from the photograph obtained with clinical instruments such as corneal topographers, wavefront sensors or pachymeters. The visualization of contact lens fiducials using images obtained with existing instruments has the advantage of allowing lens position to be directly measured relative to a corneal landmark or axis which is already being determined with that instrument. For example, when used with a corneal topographer, the position of the fiducials relative to the center or axis of the topography map may be determined. Many existing topographers allow the operator to use a mouse to click within the topography map, then will display on the screen the location of this point of interest relative to the center of the map. If the corneal edge or limbus is also visible in the image, then the location of the fiducial relative to the corneal center may subsequently be determined. Corneal topographers provide a large area of specular reflection from the anterior eye surface, and so are particularly useful when visualizing non-opaque surface marks made by material subtraction or addition.

The markings may be placed onto the lens, lens tool, or lens mold by any suitable marking technology. Lens markings may function by either material subtraction method or material addition methods. Preferred marking methods include pad printing, and ink jet printing. Other marking methods are possible, including but not limited to laser etching, ink jet printing, milling, photolithography, surface printing, or EDM (electro-dynamic machining). Any of the markings can be placed on the anterior/front side (preferred), posterior/back curve side, or a combination of both. With any of the proposed markings, care must be taken to provide visibility of the marks without impacting comfort to the patient.

A preferred fiducial pattern is depicted in FIG. 1. Other exemplary fiducial patterns are shown in FIGS. 3 through 7. Additionally, other mark designs and patterns are possible according to the description provided herein. The preferred fiducialized lens of the invention has a diameter that is 12 to 15 mm, a center thickness that is 60 to 250 microns, a base curve that is 8 to 9 mm, and the preferred depth of the markings are from 20 to 40 microns with a range of 10 to 100 microns.

In all embodiments, multiple marks are placed along the horizontal or vertical axis of the lens. The geometric center of the fiducialized lens is clear. (See FIGS. 1, 3-9). While the figures show circular markings, the markings could take on any suitable shape provided they meet the other parameters of the invention. The preferred width for these markings is between about 0.1 to 0.2 mm, but sizes up to about 1 mm are acceptable.

In another embodiment, multiple marks are placed along the horizontal axis of the lens. The geometric center of the fiducialized lens is clear. (See FIGS. 1, 3, 5-7). The markings could take on any suitable shape. The preferred width for these markings is between about 0.1 to 0.2 mm, but sizes up to about 1 mm are acceptable. The preferred spacing for the inner pair of marks are about 2.5 mm but could range from about 1.5 to 5 mm. The preferred spacing of the outer pair is about 9 mm but could range from about 8 to 12 mm.

In another alternate embodiment, multiple marks are placed along the vertical axis of the lens. The geometric center of the trial lens is clear. (See FIG. 4). The markings could take on any suitable shape. The preferred width for these markings is between about 0.1 to 0.2 mm, but sizes up to about 1 mm are acceptable. The preferred spacing for the inner pair of marks are about 2.5 mm but could range from about 1.5 to 5 mm. The preferred spacing of the outer pair is about 9 mm but could range from about 8 to 12 mm.

In another alternate embodiment, (FIG. 5) a diamond shaped pattern of marks is placed along the vertical and horizontal axes of the lens. In the embodiment shown in FIG. 5, the two axes are distinguished by increased separation of one of the sets of marks. The center of the lens is not specified. While the figures attached show circular markings, the markings could take on any suitable shape. The preferred width for all of these markings is between about 0.1 to 0.2 mm, but sizes up to about 1 mm are acceptable.

Figure 6:
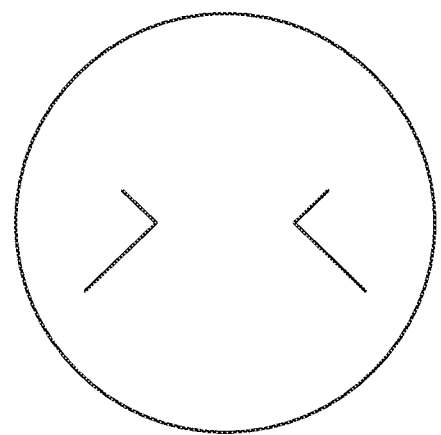
FIG. 6 Shows a fiducial design according to an aspect of the inventive method.
Figure 7:
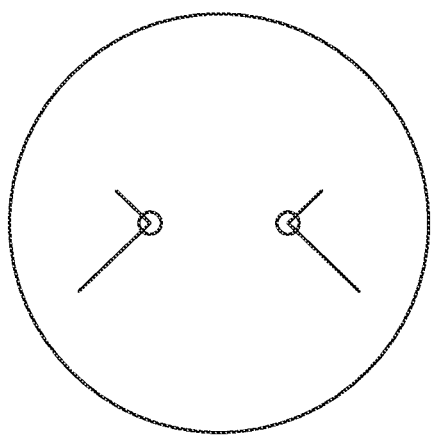
FIG. 7 Shows a fiducial design according to an aspect of the inventive method.

FIGS. 6 and 7 show additional alternate embodiments for the marking. Other designs are possible. There is no specific mark at the geometric center of the inventive lens in any case. The lens is used solely to determine the geometric position on the eye relative to the corneal center.

The decentration and rotation of the fiducialized lens can be estimated, or preferably calculated precisely by the analysis of a series of captured digital electronic images. Lens markings manufactured by material subtraction or addition can be viewed and recorded most easily using direct co-axial illumination utilizing both specular and diffuse reflections from the lens front surface. With the fiducial markings in place, the contact lens position (r, theta) relative to the center of the cornea can be determined using direct observation or by subsequent analysis of photographic images of the contact lens on eye.

The following describes the preferred step by step data reduction method pursuant to the current invention.

1. Measure the patient's basic refractive prescription, high order refractive aberrations, and corneal topography.
2. Design and manufacture a rotationally stabilized customized contact lens which incorporates custom spherocylinder, high order aberrations, or corneal topography; and with a mark or marks which can be used to manually or semi-automatically calculate the rotation and centration of the lens on the eye relative to the corneal limbal center.
3. Fit the fiducialized contact lens to the patient's eye and obtain an image of same. A digital electronic image is preferred. This can be a single digital image or a series of images over time, from which an average result is derived.
4. Preferably, load the image or series of images into image analysis software that is capable of measuring the distance between points, and the geometric angle subtended by two points measured from a predefined datum. In an alternate embodiment, the geometries can be calculated manually by inspection of the image.
5. Using the outermost marks on each side which are at a known, predetermined distance from each other, in a pattern with inner and outer marks, perform a calibration of the image. This done by calculating the pixel distance between these two marks from the image and applying the known linear distance from the marks on the lens in units of (pixels/mm). Since lens wrap on the eye and dehydration may have an effect on the spacing of markings, an alternate calibration method is described. In this alternate calibration method, a calibration ruler or any suitable object with markings at known spacing is placed into a fixture that holds the object at the same plane as the apex of the cornea and perpendicular to the measurement device. An image is taken of this object and used to derive the pixel to linear distance calibration conversion. In a second alternate calibration method, the HVID (horizontal visible iris diameter) of the cornea is measured by an external device, such as a ruler or graticule in a slit lamp. This known distance is then used within the first method described above as a known distance in an image of the eye to generate the pixel per linear distance conversion.
6. Outline the corneal limbus by highlighting several (preferred at least 4, usable anything >4) points.
7. Determine the centroid of the corneal limbus from the data in step 6.

8. In a preferred embodiment, determine the positions of the innermost two marks on the trial lens. From that, calculate the position midway between the marks which corresponds to the lens center, and the geometric rotation angle of the pattern and lens.
9. In an alternate embodiment, outline points on the edge of the trial contact lens by highlighting several (preferred at least 4, usable anything >4) points, and determine the centroid of the trial contact lens by fitting, in an orthogonal least square sense, a circle to the selected point. From this, the decentration, or a proportion of the decentration of the lens, can be calculated using simple geometrics. The rotation angle can be measured in a separate calculation.
10. Calculate the distance and direction of the trial lens center from the corneal centroid.
11. Apply this to a final custom lens made for this patient. Full application is preferred but a partial percentage of the total may also be considered as an alternate embodiment. This is achieved by applying a correction to the position of the optical zone in the lens with respect to its geometrical center. This is described in detail in Example 1.

The datum produced by the corneal center may be found as the centroid of an ellipse or circle fitted to the limbus. The location of the limbus within the image may be found by visual inspection (user clicks on the image using a mouse). The limbus may also be found semi-automatically using software which calculates the best-fit circle or ellipse as described in the literature (Morelande et al, 2002).

This invention may also be applied to any other type of customized contact lens design where it would be useful to use a fitting lens to predict lens centration and/or rotation for an individual. These fiducials may also be used on any type of contact lens in a research setting to gather population data on centration and/or rotational performance, which would provide useful information to feed back to future contact lens designs.

The fiducialized contact lens may be used to determine contact lens centration and rotation in any direction of gaze including primary gaze, peripheral gaze and reading gaze with the inclusion of appropriately positioned cameras. It is possible to also record lens centration and rotation over time (video) and use some time-based average to derive lens position metrics. For example, during near work and reading—monitor fiducials over time.

EXAMPLES

Example 1

Customized fiducialized trial contact lenses were used in a custom contact lens wavefront correcting study, CR-1554AF, using the invention herein. The customized fiducialized trial contact lenses were made according to the design shown in FIG. 3, with two ring fiducials scribed into the front surface. The preferred width for these markings is between about 0.1 to 0.2 mm, but sizes up to about 1 mm are acceptable. The preferred spacing for the inner pair of marks are about 2.5 mm but could range from about 1.5 to 5 mm. The preferred spacing of the outer pair is about 9 mm but could range from about 8 to 12 mm. An advantage of circular fiducial markings is that they continue to be circular even when the lens is rotated, which makes them more suitable for automated detection and analysis.

Figure 2:
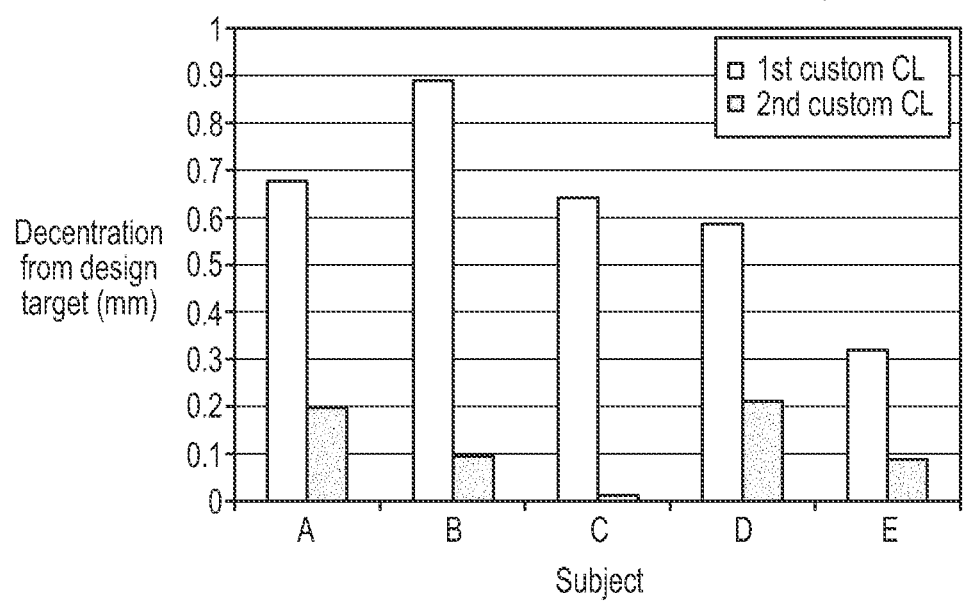
FIG. 2 Shows the improvements obtained by using a customized fiducialized trial contact lens according to this invention.
Figure 3:
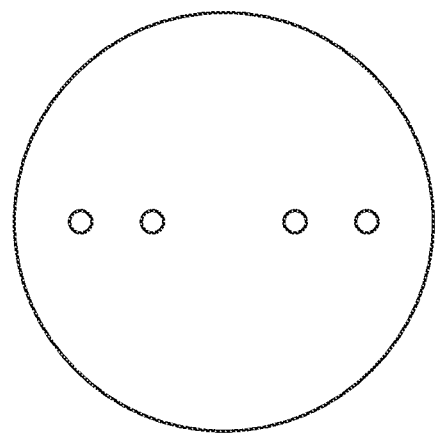
FIG. 3 Shows a fiducial design according to an aspect of the inventive method.
Figure 4:
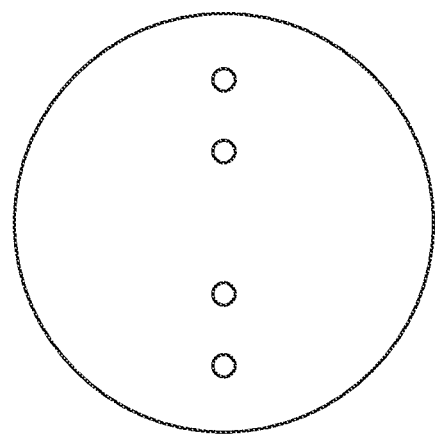
FIG. 4 Shows a fiducial design according to an aspect of the inventive method.
Figure 5:
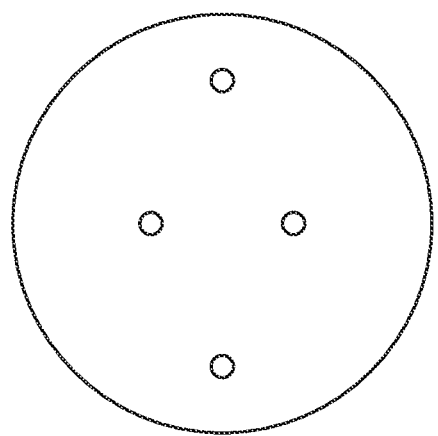
FIG. 5 Shows a fiducial design according to an aspect of the inventive method.

The $1^{st}$ custom fiducialized lenses (designed for zero decentration from the corneal center) were inserted in the subject's eyes and allowed to settle for at least 15 minutes. Six images were captured with a Keratron videokeratoscope, and then each image was analyzed 3 times to yield 18 measurements of lens centration and rotation. A second set of customized lenses was then manufactured to include an optic zone with a compensatory shift in the optic zone. The results are summarized in Table 1 and shown graphically in FIG. 2. It can be seen readily that the $2^{nd}$ fiducialized lens centered close to the design target (which was the position of the $1^{st}$ fiducialized lens).

TABLE 1

| Subject | decentration of $1^{st}$ fiducialized lens from design target (corneal center) | decentration of $2^{nd}$ fiducialized lens from design target (1st fiducialized lens position) |
|---|---|---|
| A | 0.676 | 0.200 |
| B | 0.890 | 0.095 |
| C | 0.644 | 0.013 |
| D | 0.588 | 0.211 |
| E | 0.321 | 0.089 |
| F | 0.381 | 0.131 |

It is especially desirable to use the customized fiducialized trial contact lenses invention for custom wavefront-correcting contact lenses, since their centration performance is likely to be affected by their unique thickness, power, and base curve. Previous experiments on custom wavefront-correcting contact lenses have revealed that the lens centration is difficult to predict by using a more conventional spherical or toric fitting lens.

We claim:

1. A customized trial contact lens having at least two fiducial marks positioned relative to the corneal limbal center of the lens, the at least two fiducial marks are positioned along at least one of a horizontal and vertical axis of the contact lens and configured as at least one of a material subtraction or addition to the contact lens on at least one of the anterior or posterior surface of the contact lens for enabling measurement of lens rotation and centration on eye to create a customized lens by applying correction factors to custom contact lens designs incorporating at least one of sphere-cylindrical refractive error, higher order aberrations, or corneal topography, wherein the at least two fiducial marks are positioned on the contact lens such that they are visibile when the contact lens is viewed to enable measurement of lens rotation and centration on eye, each fiducial mark has a width of between 0.1 and 0.2 mm.

2. The lens of claim 1 that is a trial contact lens that includes correction factors for custom sphero-cylindrical refractive error, higher order aberrations, or corneal topography.

3. The lens of claim 1 wherein the fiducialization marks do not obscure the center of the lens.

* * * * *